United States Patent
Nakano

[19]

[11] Patent Number: 5,942,873
[45] Date of Patent: Aug. 24, 1999

[54] PERMANENT MAGNET TYPE SYNCHRONOUS MACHINE

[76] Inventor: Kazuo Nakano, 1-8-19, Mishuku, Setagaya-ku, Tokyo, Japan

[21] Appl. No.: 09/061,339

[22] Filed: Apr. 17, 1998

[30] Foreign Application Priority Data

Apr. 18, 1997 [JP] Japan .................................... 9-134213

[51] Int. Cl.$^6$ ................................ H02K 1/14; H02K 1/27
[52] U.S. Cl. ......................... 318/702; 310/156; 310/261; 310/269
[58] Field of Search .................................... 318/538, 700, 318/702; 310/152, 156, 162, 254, 258, 259, 261, 264, 265, 267, 269

[56] References Cited

U.S. PATENT DOCUMENTS

| | | | |
|---|---|---|---|
| 3,950,663 | 4/1976 | Mead | 310/112 X |
| 4,933,584 | 6/1990 | Harms et al. | 310/162 |
| 5,266,859 | 11/1993 | Stanley | 310/216 |
| 5,315,198 | 5/1994 | Torok | 310/162 |
| 5,751,089 | 5/1998 | Stridsberg | 310/12 |

*Primary Examiner*—Bentsu Ro
*Attorney, Agent, or Firm*—Armstrong, Westerman, Hattori, McLeland & Naughton

[57] ABSTRACT

In a synchronous machine, an armature structure has n (n being a positive integer) salient poles provided at predetermined circumferential distances around a rotary shaft and coils wound on the salient poles respectively, and a field system is constituted by (n−1) permanent magnet pieces arranged like a ring as a whole around the rotary shaft closely to radially outer ends of the salient poles of the armature structure, the respective permanent magnet pieces being magnetized radially so that north and south poles are alternately arranged respectively on inner circumferential surfaces of the permanent magnet pieces, and each of boundary lines between adjacent ones of the permanent magnet pieces is inclined at a predetermined angle relative to a direction parallel to the rotary shaft in such a manner that when the radially outer ends of the salient poles opposite to the inner circumferential surfaces of the permanent magnet pieces are circumferentially developed and projected onto a development where the inner circumferential surfaces of the permanent magnet pieces are circumferentially developed and when a certain one of the boundary lines comes between two of the salient poles adjacent to each other, the one boundary line passes at the same time two diagonally opposite apexes of projected rectangles corresponding to the radially outer ends of the two salient poles adjacent to each other.

3 Claims, 4 Drawing Sheets

PERMANENT MAGNET TYPE SYNCHRONOUS MACHINE

BACKGROUND OF THE INVENTION

1. Field of the Invention

The present invention generally relates to a synchronous machine, and particularly relates to a permanent magnet type synchronous machine which generates electric power or produces rotation torque through relative rotation between a field system constituted by a permanent magnet structure and an armature structure with an armature winding wound thereon.

2. Description of the Related Art

Synchronous machines, that is, synchronous generators or synchronous motors are roughly classified into two types, that is, synchronous machines of the armature rotation type and of the field system rotation type. Most of those synchronous machines using permanent magnets as their field system are of the field system rotation type. In any case, the number of magnetic poles of a field system and the number of salient poles of an armature often provide a ratio of integers such as (n−1):n, where n is an integer. Further, each unit of a plurality of permanent magnets constituting a ring field system is magnetized in the order of a north pole (hereinafter referred to as "N pole") and a south pole (hereinafter referred to as "S pole") or an S pole and an N pole in the radial direction from the inside toward the outside, so that N and S poles are arranged alternately as a whole in the circumferential direction of this ring field system viewed from the inside to the outside in the radial direction. For example, a three-phase permanent magnet electric rotation machine of such a type is disclosed in Japanese Patent Unexamined Publication No. Sho-63-294243 (corresponding to U.S. Pat. No. 4,774,428).

In such a conventional permanent magnet type synchronous machine, each permanent magnet is magnetized in the order of an N pole and an S pole or an S pole and an N pole in the radial direction from the inside toward the outside in the ring permanent magnet structure of the field system. Accordingly, the strongest attraction force is generated between a certain magnetic pole of the permanent magnet and a certain salient pole of the armature when those poles come just in opposition to each other, while when the salient pole of the armature comes into a valley portion between two adjacent magnetic poles, the attraction force suddenly decreases. Thus, strong cogging is caused in rotation of the armature. There has been therefore a problem that, in the case of a generator, not only strong rotation torque is required but also the power generation is small and changes large, and in the case of a motor, the smooth rotation cannot be effected and the output torque is small.

In order to improve such a cogging problem, Japanese Patent Unexamined Publication No. Sho-59-44957 has proposed a technique in which skew is given to magnetic poles constituting a magnetic field.

However, as a result of study of the present inventor, it has been found that the manner how to give skew to magnetic poles constituting a magnetic field is the problem, and the way of giving skew may change the degree of cogging, and has a large influence on the output.

SUMMARY OF THE INVENTION

It is therefore an object of the present invention to solve the foregoing problem in the conventional synchronous machines in that the cogging torque is large and the rotation is not smooth so that the electrical output is small relative to the mechanical input, and vice versa.

It is another object of the present invention to provide a synchronous machine such as a synchronous generator, a synchronous motor, etc., in which a large output can be obtained relative to a small input, that is, high efficiency of running can be obtained.

In order to achieve the above objects, according to the present invention, provided is a synchronous machine comprising an armature structure and a field system which are disposed so as to be rotatable relative to each other with respect to a rotary shaft; wherein the armature structure has n (n being a positive integer) salient poles provided at predetermined circumferential distances around the rotary shaft and coils wound on the salient poles respectively and connected to each other so as to constitute an armature winding; and wherein the field system is constituted by (n−1) permanent magnet pieces arranged like a ring as a whole around the rotary shaft closely to radially outer ends of the salient poles of the armature structure, the respective permanent magnet pieces being magnetized radially so that north and south poles are alternately arranged respectively on inner circumferential surfaces of the permanent magnet pieces, and each of boundary lines between adjacent ones of the permanent magnet pieces is inclined at a predetermined angle relative to a direction parallel to an axis of the rotary shaft in such a manner that when the radially outer ends of the salient poles opposite to the inner circumferential surfaces of the permanent magnet pieces are circumferentially developed and projected onto a development where the inner circumferential surfaces of the permanent magnet pieces are circumferentially developed and when a certain one of the boundary lines comes between two of the salient poles adjacent to each other, the one boundary line passes at the same time two diagonally opposite apexes of projected rectangles corresponding to the radially outer ends of the two salient poles adjacent to each other.

Preferably, the value of n is selected to be 9.

Preferably, the predetermined angle is set to about 10 degrees.

In the thus configured synchronous machine, the number of salient poles of the armature structure is selected to be n and the number of the permanent magnet pieces of the field system structure is selected to be (n−1), so that only a certain one of the permanent magnet piece of the field system and a certain one of the salient poles of the armature structure can come just in opposition to each other while, at this time, any of the other magnet pieces cannot come just in opposition to any of the other salient poles so that the cogging is reduced at some extent.

Further, according to the present invention, the respective permanent magnet pieces are magnetized radially so that N and S poles are alternately arranged respectively on inner circumferential surfaces of the permanent magnet pieces, and each of boundary lines between adjacent ones of the permanent magnet pieces is inclined at a predetermined angle relative to a direction parallel to an axis of the rotary shaft in such a manner that when the radially outer ends of the salient poles opposite to the inner circumferential surfaces of the permanent magnet pieces are circumferentially developed and projected onto a development where the inner circumferential surfaces of the permanent magnet pieces are circumferentially developed and when a certain one of the boundary lines comes between two of the salient poles adjacent to each other, the one boundary line passes at the same time two diagonally opposite apexes of projected rectangles corresponding to the radially outer ends of the two salient poles adjacent to each other.

With such a configuration, in crossover angular regions in the front and behind of the position where the magnetic pole of a certain permanent magnet piece is just in opposition to a certain salient pole, the effective attraction force generated between the magnetic pole of the permanent magnet piece and the salient pole of the armature structure does not vary largely. This fact contributes to reduction of the cogging. Accordingly, it is possible to provide a synchronous machine in which cogging is minimized and in which mechanical and electric energy losses are reduced so that a large output can be supplied with a small input.

DETAILED DESCRIPTION OF THE PREFERRED EMBODIMENT

An embodiment of the present invention will be described in detail with reference to the drawings.

Figure 1:
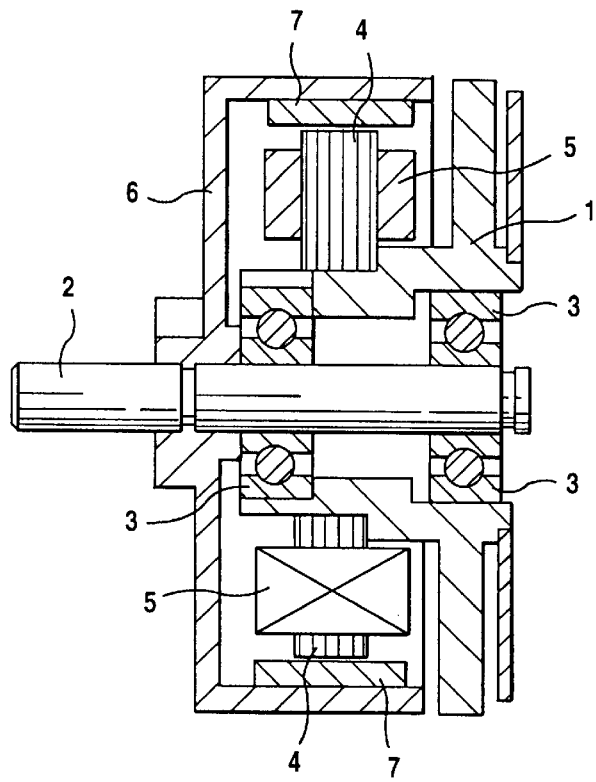
FIG. 1 is a vertically sectional side view showing a rotating-field type permanent magnet synchronous generator according to an embodiment of the present invention.
Figure 2:
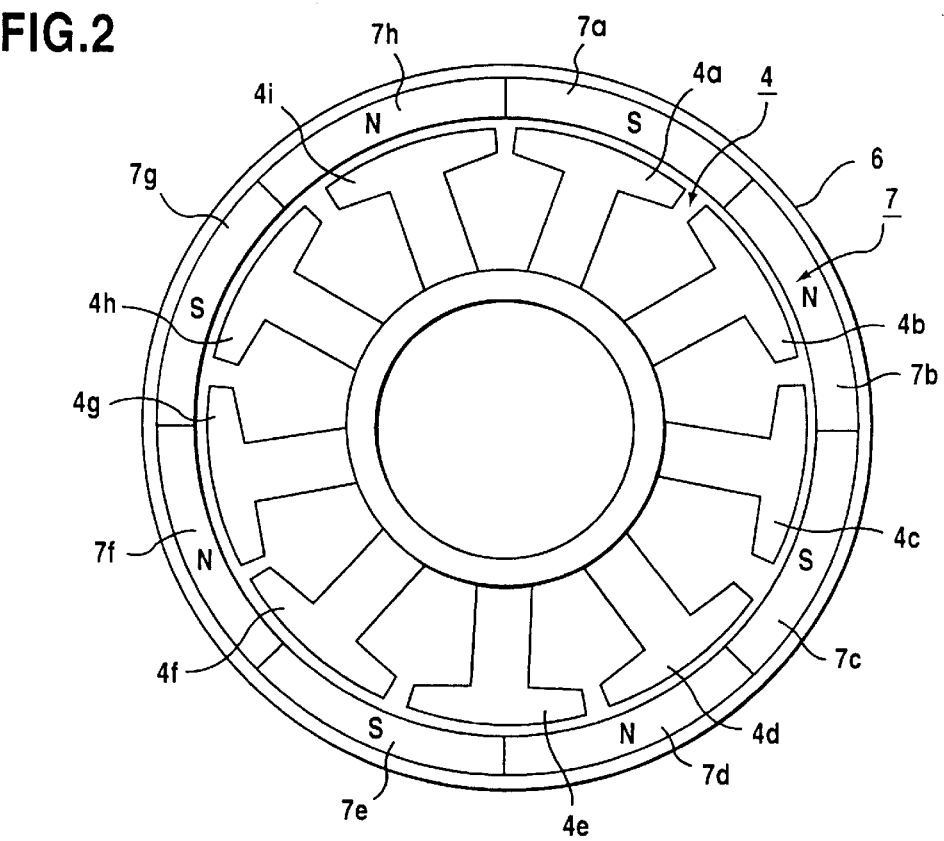
FIG. 2 is a front view showing the positional relation between an armature core and a permanent magnet field system of the synchronous generator of FIG. 1.
Figure 3A:
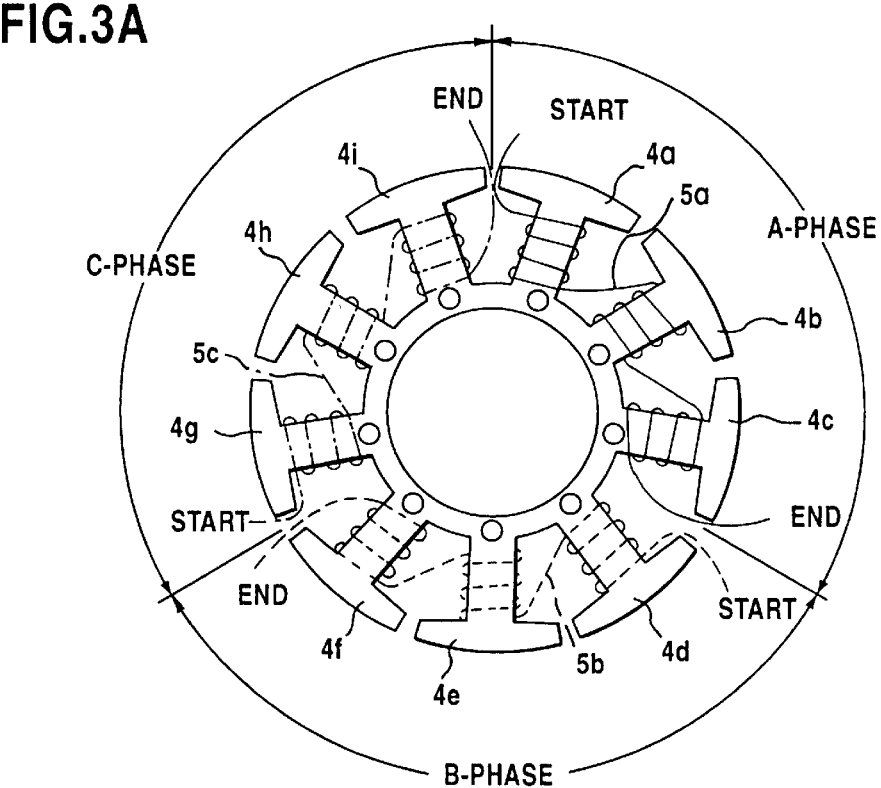
FIG. 3A is a front view showing the winding state of coils in respective phase windings wound on the armature core of FIGS. 1 and 2.
Figure 3B:
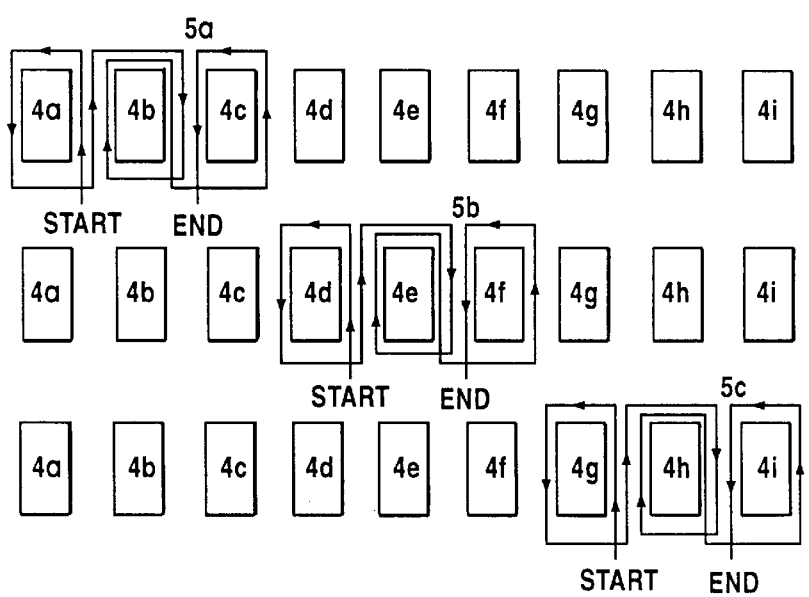
FIG. 3B is a schematic development showing the winding directions of coils wound on respective salient poles in the respective phase windings.
Figure 4A:
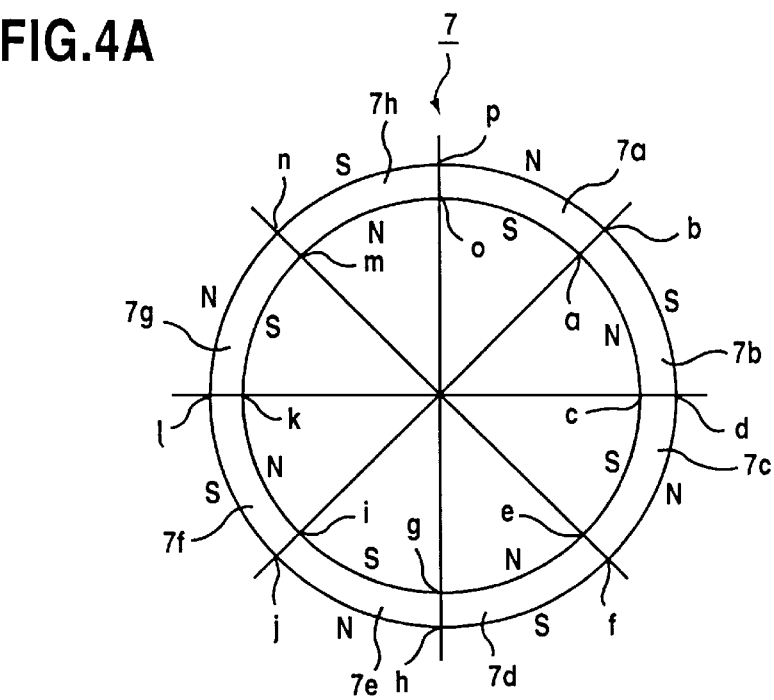
FIG. 4A is a front view of the ring permanent magnet structure of the field system.
Figure 4B:
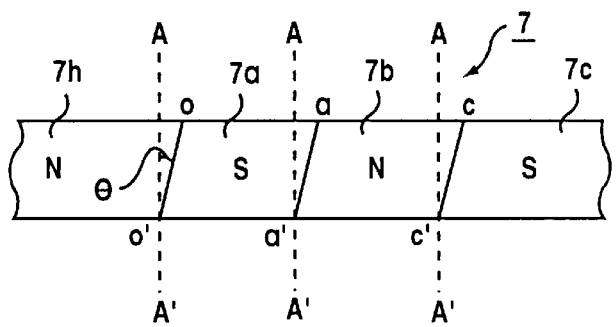
FIG. 4B is a development showing a part of the circumferentially developed inner circumferential surface of the ring permanent magnet structure shown in FIG. 4A.
Figure 4C:
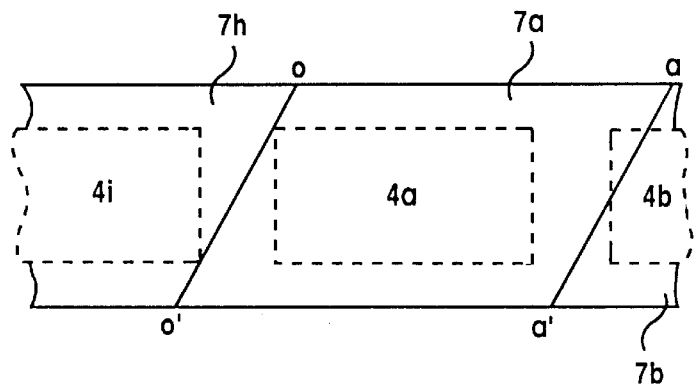
FIG. 4C is an enlarged development showing a part of FIG. 4B, in which salient poles of the armature core in FIG. 2 are developed and projected thereon.

FIG. 1 shows a rotating-field type permanent magnet synchronous generator according to an embodiment of the present invention. FIG. 2 shows the positional relation between an armature core and a permanent magnet field system of the synchronous generator of FIG. 1. FIG. 3A explains the state of three phase windings on the armature core of FIGS. 1 and 2, while FIG. 3B shows the winding directions of coils wound on respective salient poles in each phase winding. FIG. 4A shows the arrangement of permanent magnet pieces in the ring permanent magnet structures FIG. 4B is a partial development of the inner circumferential surface of the ring permanent magnet structure shown in FIG. 4A, and FIG. 4C is a projection development in which in the development of the inner circumferential surface of the ring permanent magnet structure, salient poles of the armature core in FIG. 2 corresponding to the portion of the ring permanent magnet structure shown in FIG. 4B are circumferentially developed and projected onto the development.

In FIG. 1, a rotary shaft 2 is rotatably supported by bearings 3 and 3 in a hollow stationary frame body 1. An armature core 4 having n salient poles (n being 9 in this embodiment) 4a, 4b, . . . 4i as shown in FIG. 2 is fixed on the stationary frame body 1. An armature winding 5 is wound on the respective salient poles 4a, 4b, . . . 4i of the armature core 4.

Figure 5:
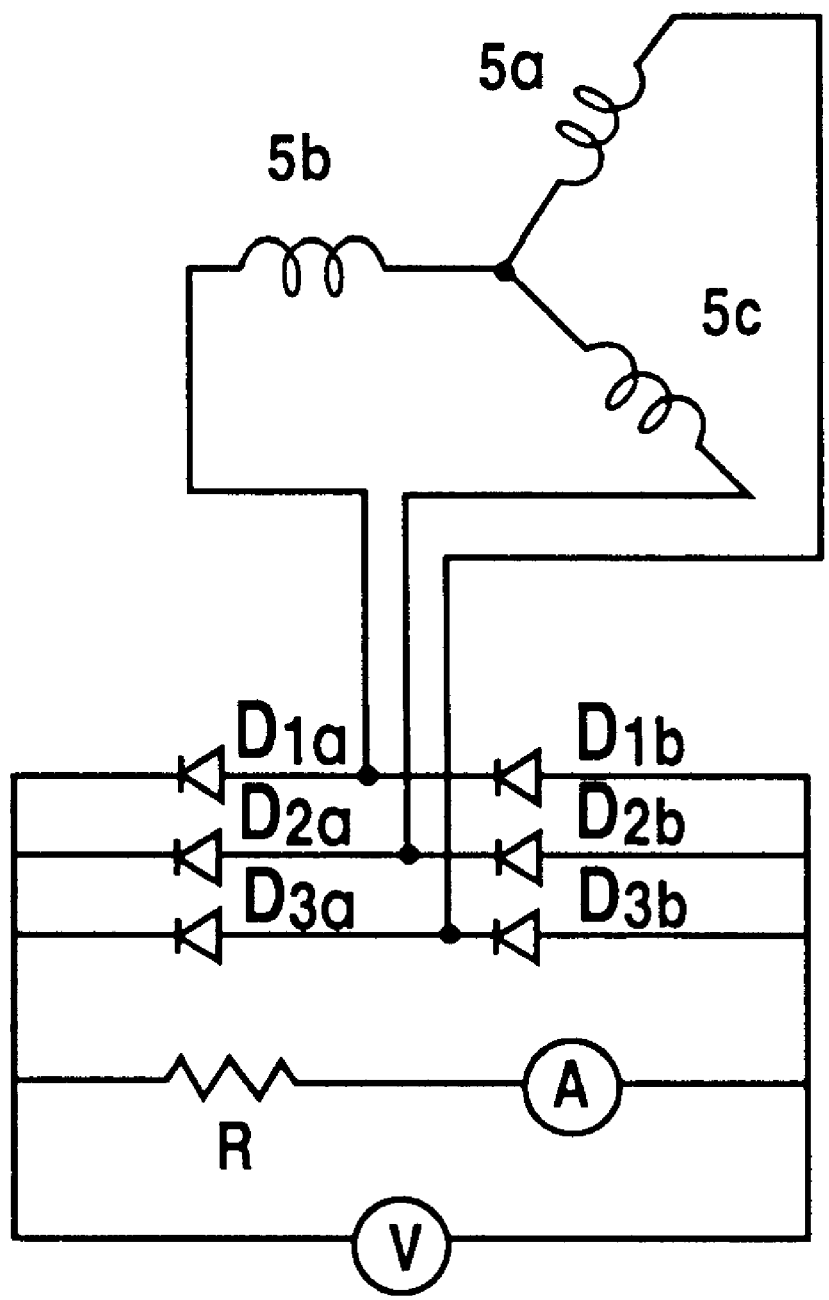
FIG. 5 is a connection diagram showing a rotating-field type permanent magnet DC generator according to the present invention.

The armature winding 5 is constituted by three windings, that is, an A-phase winding 5a, a B-phase winding 5b, and a C-phase winding 5c. The A-phase winding 5a is wound in such a manner that, as shown in FIGS. 3A and 3B, it is started to be wound on the salient pole 4a, then wound on salient poles 4b and 4c successively, and finally the end of the winding 5a is led out from the salient pole 4c. The winding direction of the A-phase winding 5a is as shown in FIG. 3B. Similarly to the A-phase winding 5a, the B-phase winding 5b is wound in such a manner that it is started to be wound on the salient pole 4d, then wound on salient poles 4e and 4f successively, and finally the end of the winding 5b is led out from the salient pole 4f. The winding direction of the B-phase winding 5b is as shown in the drawing. Also the C-phase winding 5c is wound in such a manner that it is started to be wound on the salient pole 4g, then wound on salient poles 4h and 4i successively, and finally the end of the winding 5c is led out from the salient pole 4i. The winding direction of the C-phase winding 5c is as shown in the drawing. That is, one phase winding is constituted by three coils wound on the three successive salient poles. The respective ends of the three windings 5a, 5b, and 5c are commonly connected to each other so as to form a so-called Y-connection (FIG. 5).

A yoke 6 is mounted on the rotary shaft 2, and a ring-shaped permanent magnet structure 7 constituting a field system is attached on the inner circumferential surface of the yoke 6 so that the inner circumferential surface of the ring-shaped permanent magnet structure 7 is closely opposite to the respective radially outer end surfaces of the salient poles 4a to 4i of the armature core 4. As shown in FIG. 2, the permanent magnet structure 7 is magnetized to be constituted by n−1 (9−1=8 in this embodiment) arc-shaped permanent magnet pieces 7a, 7b, . . . 7h, the number of the arc-shaped permanent magnet pieces being smaller by one than the number of the salient poles of the armature structure. More specifically, as shown in detail in FIG. 4A, each of the arc-shaped permanent magnet pieces 7a, 7b, . . . 7h is magnetized in the radial direction, so that, for example, the permanent magnet piece 7a is magnetized in the radial direction in such a manner that the inner circumferential side thereof is magnetized so as to be an S pole while the outer circumferential side of the same is magnetized so as to be an N pole; the next permanent magnet piece 7b is magnetized in the radial direction reversely to the case of the permanent magnet piece 7a in such a manner that the inner circumferential side is magnetized so as to be an N pole while the outer circumferential side of the same is magnetized so as to be an S pole; the next permanent magnet piece 7c is magnetized in the radial direction reversely to the case of the permanent magnet piece 7b in such a manner that the inner circumferential side thereof is magnetized so as to be an S pole while the outer circumferential side of the same is magnetized so as to be an N pole; and thereafter each of the permanent magnet pieces 7d to 7h is magnetized in the radial direction in the same manner as in the foregoing cases. That is, the permanent magnet structure 7 as a whole is magnetized in such a manner that N and S poles are arranged circumferentially alternately in the inner circumferential surface.

As described above, the number of magnetic poles in the inner circumferential surface of the permanent magnet structure 7 is selected to be n−1 (8 in this embodiment) which is smaller by one than the number n (9 in this embodiment) of the salient poles of the armature core 4. Therefore, always only one pair of a certain one of the permanent magnet pieces 7a, 7b, . . . 7h and a certain one of the salient poles 4a, 4b, . . . 4i come just in opposition to each other, while any one of other magnetic poles of the permanent magnet pieces and any one of other salient poles never come just in opposition to each other as a pair at the same time.

FIG. 4B is a development showing a part of the circumferentially developed inner circumferential surface of the ring-shaped permanent magnet structure shown in FIG. 4A. FIG. 4C shows a part of enlargement of the development of FIG. 4B on which a part of the circumferentially developed salient poles of the armature core in FIG. 2 corresponding to this portion of the ring-shaped permanent magnet structure shown in FIG. 4B is projected. That is, in FIG. 4C, the dotted lines indicate the portions where the top portion of the salient pole 4a and the top portions of the salient poles 4i and 4b adjacent to the salient pole 4a in FIG. 2 are projected radially onto the development of the inner circumferential surface of the ring-shaped permanent magnet structure. That is, the projection of the top portion of the salient pole 4a is shown as a complete rectangle 4a by the dotted lines, while the projections of the respective top portions of the salient poles 4i and 4b adjacent to the salient pole 4a are shown as partial rectangles by the similar dotted lines.

As seen in FIG. 4B, each of the permanent magnet pieces 7a, 7b, . . . 7h, is made skew so that each of the boundary lines (a-a', c-c', e-e', . . . ) in the inner circumferential surfaces of adjacent permanent magnet pieces (7a and 7b; 7b and 7c; 7c and 7d . . . ) is inclined at a predetermined angle θ relative to the direction parallel to the axis of the rotary shaft 2 (the line A—A in FIG. 4A). As a result of various experiments carried out by the present inventor, it was found that it was most effective in reducing cogging to make the boundary line be inclined at an angle of about 10 degrees when the number of the salient poles of the armature structure was selected to be 9. Further, through various experiments done by the present inventor, it was found that it was most effective to make the boundary lines be inclined such that, for example, as shown in the projection development of FIG. 4C, a certain boundary line, for example, the boundary line o-o', came diagonally between two adjacent rectangles 4i and 4a at a certain instance so as to pass diagonally the opposite apexes of the projected rectangles 4i and 4a which were the projections of the tops of two salient poles 4i and 4a adjacent to each other through a circumferential distance. At this instance, any other boundary line does not come into such a positional relation with respect to any adjacent salient poles.

With such a configuration, in crossover angular regions in the front and behind of the position where the magnetic pole of a certain permanent magnet piece is just in opposition to a certain salient pole, the effective attraction force generated between the magnetic pole of the permanent magnet piece and the salient pole of the armature structure does not vary so largely. That is, for example, as shown in FIG. 2, when the S pole of the permanent magnet piece 7a which is just in opposition to the salient pole 4a of the armature core 4 begins to separate from the salient pole 4a as the permanent magnet structure 7 rotates, the attraction force between the S pole of the permanent magnet piece 7a and the salient pole 4a is gradually weakened. However, the attraction force between the salient pole 4b and the N pole of the permanent magnet piece 7b which are located adjacent to the salient pole 4a and the S pole of the permanent magnet piece 7a respectively gradually increases so that the reduction of the attraction force between the salient pole 4a and the S pole of the permanent magnet piece 7a is substantially canceled. Accordingly, the fluctuation of cogging due to the armature core 4 and the magnetic pole of the permanent magnet structure 7 constituting the field system is reduced. This effect depends on the fact that each of the boundary lines of adjacent ones of the permanent magnet pieces is inclined at a predetermined angle θ relative to the direction parallel to the axis of the rotary shaft 2, and has the above-mentioned positional relation with respect to the top shapes of the salient poles.

FIG. 5 shows the wiring connection of the rotating-field type permanent magnet DC generator according to the present invention. The respective winding termination ends of the 3-phase windings 5a, 5b and 5c are commonly connected to each other and the respective winding start ends of the same are connected to the respective junctions between series-connected diodes $D_{1a}$ and $D_{1b}$, between series-connected diodes $D_{2a}$ and $D_{2b}$, and between series connected diodes $D_{3a}$ and $D_{3b}$. The respective cathodes of the diodes $D_{1a}$, $D_{2a}$, $D_{3a}$ are commonly connected to each other and the respective anodes of the diodes $D_{1b}$, $D_{2b}$ and $D_{3b}$ are commonly connected to each other. Then, a DC voltage is generated between the cathode and anode common terminals, that is, across a load resistance R connected between the common terminals.

In the rotating-field type permanent magnet DC generator according to the present invention, each of the circumferential ends of the arc-shaped permanent magnet pieces 7a, 7b, . . . 7h of the permanent magnet structure 7 constituting a field system is inclined with respect to the axial direction of the rotary shaft 2 as described above. Therefore, changes of the magnetic flux density generated in the salient poles 4a, 4b, . . . 4i are suppressed before and after the position where a certain salient pole is just in opposition to a certain permanent magnet piece so that a current generated in an armature winding 5 substantially has no fluctuation. As a result, a ripple component contained in a DC output can be reduced.

Although it is designed that the permanent magnet structure 7 constituting the field system is rotatable in the foregoing embodiment, the armature structure with the armature winding 5 disposed inside the permanent magnet structure 7 may be designed to be rotatable. In this case, the conventional brush means may be used to take out the electric power. Moreover, no excitation current loss is generated because the permanent magnet is used. If SITs or the like having a small loss are used as the rectifying elements, the loss can be further reduced. Further, since the magnetic flux density crossing the armature winding 4 is broadened and flattened at its peak area, the waveform thereof becomes substantially trapezoidal, so that the conversion efficiency is excellent when the current is converted into a DC current through the diodes.

Further, although description has been made as to a generator in the foregoing embodiment, it is a matter of course that the present invention may be applied to an electric motor because the mechanism of the generator is the same as that of the motor.

Although the present invention has been described with reference to the preferred embodiments, the description has been made merely for understanding of the present invention and the present invention can be variously modified so long as the modification is not departed from the scope of the following claims.

What is claimed is:

1. A synchronous machine comprising an armature structure and a field system which are disposed so as to be rotatable relative to each other with respect to a rotary shaft; wherein said armature structure has n (n being a positive integer) salient poles provided at predetermined circumferential distances around said rotary shaft and coils wound on said salient poles respectively and connected to each other so as to constitute an armature winding; and wherein said field system is constituted by (n−1) permanent magnet pieces arranged like a ring as a whole around said rotary shaft closely to radially outer ends of said salient poles of said armature structure, said respective permanent magnet pieces being magnetized radially so that north and south poles are alternately arranged respectively on inner circumferential surfaces of said permanent magnet pieces, and each of boundary lines between adjacent ones of said permanent magnet pieces is inclined at a predetermined angle relative to a direction parallel to an axis of said rotary shaft in such a manner that when said radially outer ends of said salient poles of said armature structure opposite to said inner circumferential surfaces of said permanent magnet pieces are circumferentially developed and projected onto a development where said inner circumferential surfaces of said permanent magnet pieces are circumferentially developed and when a certain one of said boundary lines comes between two of said salient poles adjacent to each other, said one boundary line passes at the same time two diagonally opposite apexes of projected rectangles corresponding to the radially outer ends of said two salient poles adjacent to each other.

2. A synchronous machine according to claim 1, wherein said positive integer is 9.

3. A synchronous machine according to claim 2, wherein said predetermined angle is about 10 degrees.

* * * * *